United States Patent [19]

Clapsaddle

[11] Patent Number: 4,463,790

[45] Date of Patent: Aug. 7, 1984

[54] FLEXIBLE AUTOMOBILE SCREEN

[76] Inventor: Charles Clapsaddle, 6689 W. Marlette Rd., Marlette, Mich. 48453

[21] Appl. No.: 422,017

[22] Filed: Sep. 23, 1982

[51] Int. Cl.³ .............................................. E06B 5/10
[52] U.S. Cl. .................................. 160/105; 160/354; 160/368 R
[58] Field of Search ................... 160/40, 91, 105, 354, 160/368 R, 371

[56] References Cited

U.S. PATENT DOCUMENTS

| | | | |
|---|---|---|---|
| 1,753,866 | 4/1930 | McCormack | 160/105 |
| 2,004,762 | 6/1935 | Larson | 160/91 |
| 2,059,924 | 11/1936 | Woina | 160/91 |
| 2,298,783 | 10/1942 | Burnett | 160/354 |
| 2,321,078 | 6/1943 | Green | 160/354 |
| 3,016,952 | 1/1962 | Shero | 160/354 |
| 3,064,725 | 11/1962 | Roark | 160/105 |
| 3,083,630 | 4/1963 | Thaxton | 160/105 |

Primary Examiner—Peter M. Caun
Attorney, Agent, or Firm—Gifford, VanOphem, Sheridan, Sprinkle & Nabozny

[57] ABSTRACT

An automobile window screen is removably disposed between opposing elements of an automobile window frame. The screen includes a pair of flexible and resilient elongated blocks, each of the blocks having a pair of longitudinal edges and a plurality of ventilation holes formed therethrough. The blocks are in abutment at positions along, but slightly spaced from, their longitudinal edges. A flexible elongated screen is abutably disposed between the blocks. The window screen possesses sufficient rigidity to extend to the opposing window frame elements when disposed in the window opening, yet possesses sufficient flexibility to be longitudinally rolled when not disposed in the window opening. Preferably, the blocks are formed from foam rubber, and Velcro strips are used to secure the screen in a rolled condition.

11 Claims, 5 Drawing Figures

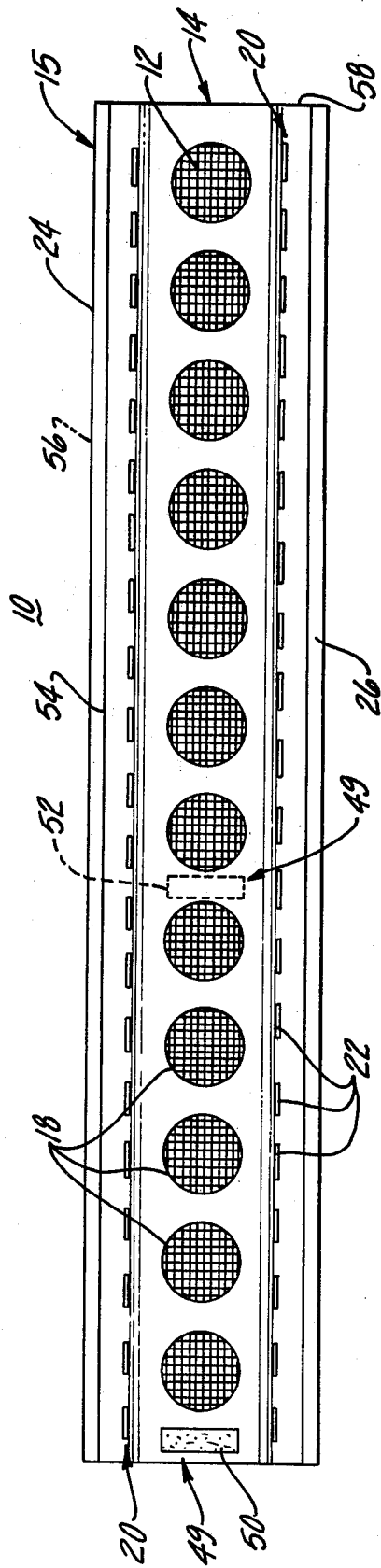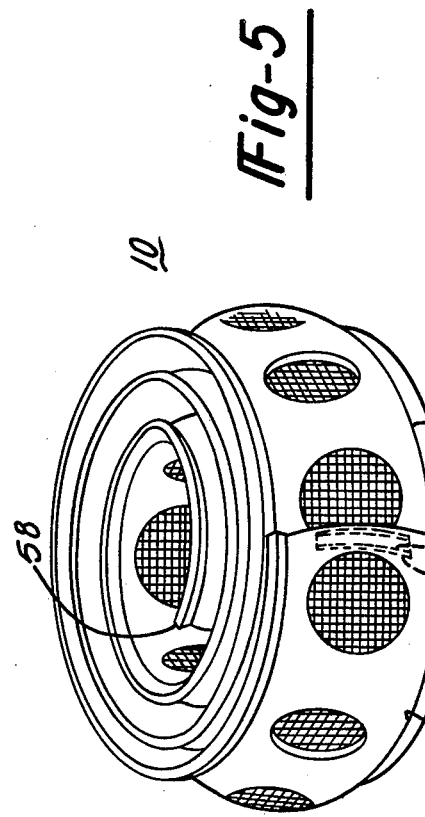

FLEXIBLE AUTOMOBILE SCREEN

BACKGROUND OF THE INVENTION

I. Field of the Invention

The present invention is directed to a screen for a window, and more particularly to a removable car window screen fittable in different sized car windows without modification, that also functions as a car pillow.

II. Description of the Prior Art

Screens for automobile windows have long been known. The purpose of such screens is, of course, to provide ventilation of the interior of the automobile while preventing insects, leaves, other debris and the like from entering the interior of the automobile.

Some previous automobile window screens were permanently mounted upon the automobile itself, and either moved in unison with the window or were mounted externally thereto. Other prior removable automobile window screens were mounted in or carried by a rigid frame or member. Although these screens were advantageous in that they were removable from the window opening, the rigid nature of their frameworks required fitting of the frameworks to particular automobile windows. This need to fit the window screen to particular automobile windows necessitated either the manufacture of a plurality of sizes and shapes of screens and frames to service a wide variety of automobile windows, or that the user needed to assemble or modify the size and shape of the screen and frame to fit the particular window in which it was desired to position the screen. These factors increased the cost and inconvenience of providing a ventilating screen in an automobile window.

SUMMARY OF THE INVENTION

The present invention overcomes the above-mentioned disadvantages by providing an automobile window screen which is of simple and inexpensive construction, yet is removably insertable between an automobile window and its associated frame without the need for modification thereof. The window screen comprises a flexible screen disposed between two perforated blocks of flexible foam rubber. The edges of the blocks form V-shaped notches capable of receiving the edge of a window, and receiving or abutting the edge of the corresponding window frame which normally engages the window when closed, thereby sealing the window screen against the window and the window frame. This construction yields a window screen which is easily removable from the window opening yet advantageously permits employment of the device in variously sized windows, since any excess length of flexible screen and flexible foam rubber may simply extend into the automobile interior, and the window screen seal is maintained by the flexibility and compressibility of the window screen. This flexibility and compressibility also permits the additional use of the device as an attractive and comfortable car pillow, when maintained in a rolled shape by use of fastening means such as Velcro strips. "Velcro" is a trademark of Velcro Corporation, which mark relates to synthetic materials which adhere when pressed together.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIG. 4 is a side view of the preferred embodiment of the present invention; and

FIG. 5 is another perspective view of the preferred embodiment of the present invention.

DETAILED DESCRIPTION OF THE PREFERRED EMBODIMENT OF THE PRESENT INVENTION

Figure 3:
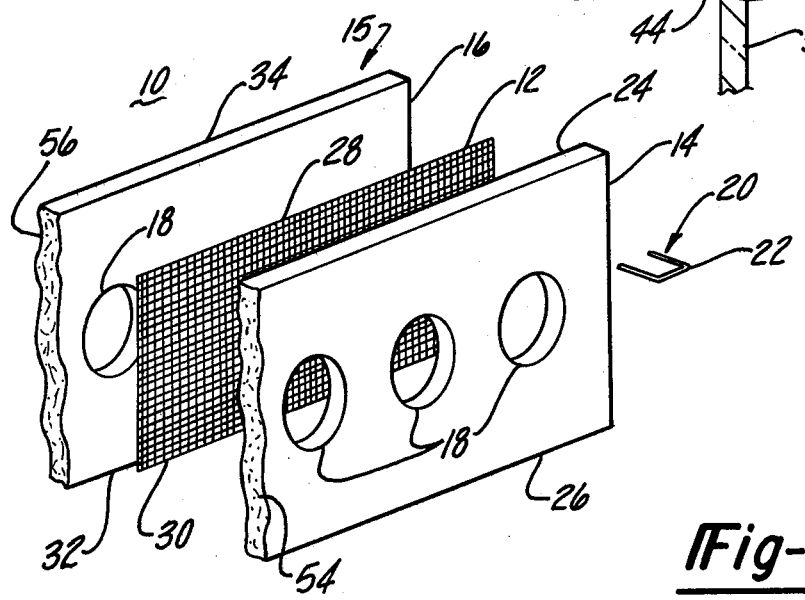
FIG. 3 is a fragmentary perspective view of a portion of the preferred embodiment of the present invention.

With reference first to FIGS. 3 and 4, the window screen 10 according to the present invention is thereshown and first comprises screening disposed between two foam rubber blocks 14 and 16. The screening preferably comprises a strip of fiberglass screen 12. The blocks 14 and 16 comprise a body 15 within which the screen 12 is at least partially disposed. The blocks 14 and 16 are approximately 1" thick and 6" wide, and each preferably has an identical number of holes 18 cut therethrough. The block 14, the screen 12, and the block 16 are joined together along, but slightly spaced from, their longitudinal edges 24 and 26, 28 and 30, and 32 and 34, respectively, by means 20 for fastening which preferably comprises a plurality of staples 22.

Figure 1:
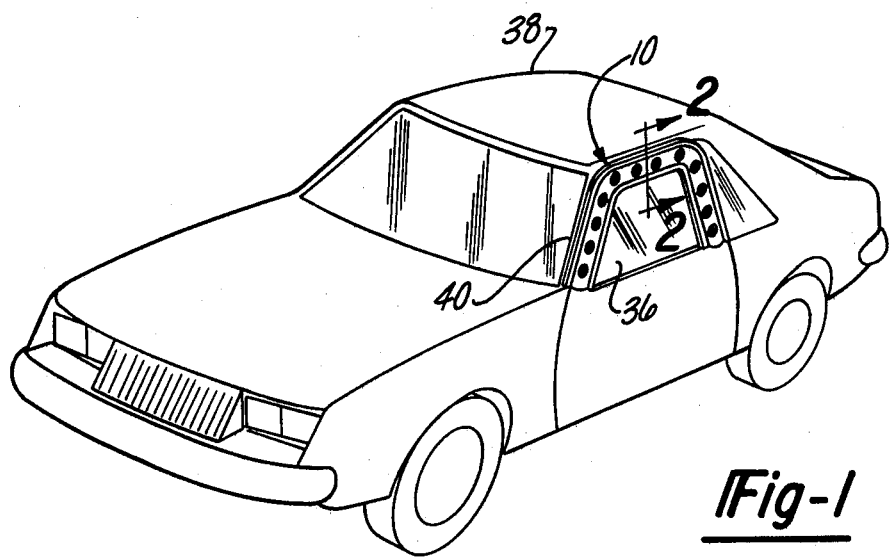
FIG. 1 is a perspective view of the preferred embodiment of the present invention in the environment in which it is used.
Figure 2:
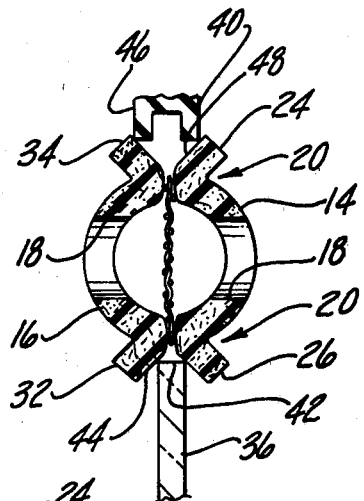
FIG. 2 is a cross-sectional view of a preferred embodiment of the present invention taken substantially along line 2—2 in FIG. 1.

As best shown in FIGS. 1 and 2, the fastening means 20 is spaced sufficiently from the longitudinal edges 24 and 26, and 32 and 34, of the blocks 14 and 16, respectively, to permit engagement of a window 36 of an automobile 38 and its associated window frame 40 with the window screen 10. This engagement occurs by insertion of a leading edge 42 of the window 36 into a V-shaped slot 44 formed from compression of fastening means 20 upon foam rubber blocks 14 and 16. Similarly, an extending edge 46 of the window frame 40 is preferably inserted into a second V-shaped slot 48 formed similarly to the slot 44.

Again referring to FIG. 4, a detachable securing means 49 comprises Velcro strips 50 and 52 disposed on faces 54 and 56 of the blocks 14 and 16 opposite the screen 12, for detachable securance of the opposing faces 54 and 56 when the device 10 is rolled into the shape of a circular pillow, as best shown in FIG. 5.

The use of the device 10 as either an insertable automobile window screen or as a car pillow is readily understood. As best shown in FIGS. 1 and 2, the automobile window 36 is lowered a sufficient amount to permit introduction of the unrolled window screen 10 between the window 36 and the window frame 40. The window screen 10 is manipulated so that the edge 42 of the window 36 becomes disposed in the V-shaped slot 44, and the edge 46 of the window frame 40 becomes disposed in the V-shaped slot 48, or otherwise abuts or engages the edges 34 and 34 of the blocks 14 and 16. Whether the edge 46 of the window frame 40 becomes disposed in the V-shaped slot 48, or only engages the edge of the window screen 10 depends, of course, on the shape of the edge 46 of the window frame 40 in which the window screen 10 is placed. Even if the edge 46 is of a shape prohibiting its entry into the V-shaped slot 48, the flexible and compressible nature of the window screen 10 permits sealing engagement of the edge 46 with the window screen 10.

After introduction of the window screen 10 between the automobile window 36 and the window frame 40, the window 36 may be raised any amount necessary to insure sealing engagement of the window screen 10 with the window 36 and the frame 40. The flexible or resilient nature of the window screen 10 permits compression of only part of the screen 10 in order to insure such sealing engagement. Any excess length of the device 10 which does not fit between the window 36 and the frame 40 may depend interiorly of the window 36 and the frame 40 without impairing the utility of the device in a particular automobile 38. This permits the use of the window screen 10 in a larger window without modification, since the excess need not be cut off when the window screen 10 is employed in a smaller automobile.

The window screen 10 is easily removed by hand from the window 36 and the frame 40 upon lowering of the window 36.

The unrolled window screen 10 may also be rolled and fastened to form a car pillow, as shown in FIGS. 4 and 5. With the Velcro strip 50 facing upwardly, out of the plane of FIG. 4, the opposing end 58 of the window screen is rolled upwardly, and rolling continues until the other Velcro strip 52 becomes adjacent to and engages the Velcro strip 50. The window screen 10 is now formed into a comfortable and attractive car pillow, one which can be unrolled into a window screen by unfastening the Velcro strips 50 and 52.

Having described my invention, however, many modifications thereto will become apparent to those skilled in the art to which it pertains without deviation from the spirit of the invention as defined by the scope of the appended claims.

I claim:

1. An automobile window screen removably disposable between opposing frame elements, comprising: a pair of flexible and resilient elongated blocks, each of said blocks having a pair of longitudinal edges and a plurality of ventilation holes formed between said longitudinal edges; said blocks being in abutment at positions along but slightly spaced from their corresponding longitudinal edges; and a flexible elongated screen disposed between said blocks and abutting each of said blocks along said positions of abutment; wherein the adjacent longitudinal edges of said blocks are spaced apart from one another sufficiently to permit the engagement of a window frame element therebetween; said window screen possessing sufficient rigidity to extend to opposing window frame elements when disposed therebetween, and sufficient flexibility to be longitudinally rolled when not so disposed.

2. The invention according to claim 1, wherein said window screen further comprises a plurality of fastening means disposed along said positions for fastening said blocks together.

3. The invention according to claim 2, wherein said fastening means comprises staples.

4. The invention according to claim 1, wherein the portions of said blocks between said positions are bowed outwardly away from said screen.

5. The invention according to claim 1, wherein said screen is a fiberglass screen.

6. The invention according to claim 1, characterized by the absence of any other means for rigidifying said window screen other than said blocks and said screen.

7. The invention according to claim 1, wherein said blocks and said screen are longer than the length of the window opening in which the window screen is to be disposed.

8. The invention according to claim 1, further comprising a V-shaped notch between said adjacent longitudinal edges.

9. The invention according to claim 1 wherein said body comprises foam rubber.

10. The invention according to claim 1 further comprising means for securing said body in a rolled condition.

11. The invention according to claim 10 wherein said securing means comprises an engageable pair of Velcro strips on opposite sides of said window screen.

* * * * *

UNITED STATES PATENT AND TRADEMARK OFFICE
CERTIFICATE OF CORRECTION

PATENT NO. : 4,463,790
DATED : August 7, 1984
INVENTOR(S) : Charles Clapsaddle

It is certified that error appears in the above—identified patent and that said Letters Patent is hereby corrected as shown below:

Column 2, line 62 delete "34" (first occurrence) and insert --24--.

Signed and Sealed this

Fifth Day of March 1985

[SEAL]

Attest:

DONALD J. QUIGG

*Attesting Officer*     *Acting Commissioner of Patents and Trademarks*